(12) United States Patent
VanGilder et al.

(10) Patent No.: US 10,102,313 B2
(45) Date of Patent: Oct. 16, 2018

(54) RAISED FLOOR PLENUM TOOL

(71) Applicant: SCHNEIDER ELECTRONIC IT CORPORATION, West Kingston, RI (US)

(72) Inventors: James William VanGilder, Pepperell, MA (US); Xuanhang Zhang, North Reading, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 414 days.

(21) Appl. No.: 14/586,803

(22) Filed: Dec. 30, 2014

(65) Prior Publication Data

US 2016/0188764 A1    Jun. 30, 2016

(51) Int. Cl.
*G06F 17/50*    (2006.01)

(52) U.S. Cl.
CPC .................. *G06F 17/5009* (2013.01)

(58) Field of Classification Search
CPC .................................................. G06F 17/5009
USPC ............................................................ 703/2
See application file for complete search history.

(56) References Cited

U.S. PATENT DOCUMENTS

| | | | |
|---|---|---|---|
| 4,823,290 A | 4/1989 | Fasack et al. | |
| 5,462,225 A | 10/1995 | Massara et al. | |
| 5,581,478 A | 12/1996 | Cruse et al. | |
| 5,682,949 A | 11/1997 | Ratcliffe et al. | |
| 5,995,729 A | 11/1999 | Hirosawa et al. | |
| 6,134,511 A | 10/2000 | Subbarao | |
| 6,216,956 B1 | 4/2001 | Ehlers et al. | |
| 6,374,627 B1 | 4/2002 | Schumacher et al. | |
| 6,574,104 B2 | 6/2003 | Patel et al. | |
| 6,672,955 B2 | 1/2004 | Charron | |
| 6,694,759 B1 | 2/2004 | Bash et al. | |
| 6,718,277 B2 | 4/2004 | Sharma | |
| 6,745,579 B2 | 6/2004 | Spinazzola et al. | |
| 6,859,366 B2 * | 2/2005 | Fink ......................... | E04H 5/02 165/121 |

(Continued)

FOREIGN PATENT DOCUMENTS

| | | |
|---|---|---|
| WO | 2006119248 A2 | 11/2006 |
| WO | 2008144375 A2 | 11/2008 |
| WO | 2009014893 A1 | 1/2009 |

OTHER PUBLICATIONS

Rambo et al. ("Modeling of data center airflow and heat transfer: State of the art and future trends", Distrib Parallel Databases (2007) 21:193-225).*

(Continued)

*Primary Examiner* — Kamini S Shah
*Assistant Examiner* — Iftekhar A Khan
(74) *Attorney, Agent, or Firm* — Lando & Anastasi, LLP

(57) ABSTRACT

According to various aspects and embodiments, a system and method for use with a raised floor data center is provided. The method according to one aspect includes receiving input data, including data related to at least one data center design parameter, determining tile airflow uniformity using the input data and at least one empirical correlation, implementing an analytical model to determine airflow distribution, the analytical model including at least one empirical formula, and using the tile airflow uniformity and the airflow distribution to evaluate airflow in a data center design.

18 Claims, 6 Drawing Sheets

(56) References Cited

U.S. PATENT DOCUMENTS

| | | |
|---|---|---|
| 6,881,142 B1 | 4/2005 | Nair |
| 6,886,353 B2 | 5/2005 | Patel et al. |
| 7,020,586 B2 | 3/2006 | Snevely |
| 7,031,870 B2 | 4/2006 | Sharma et al. |
| 7,251,547 B2 | 7/2007 | Bash et al. |
| 7,313,503 B2 | 12/2007 | Nakagawa et al. |
| 7,365,973 B2 | 4/2008 | Rasmussen et al. |
| 7,366,632 B2 | 4/2008 | Hamann et al. |
| 7,472,043 B1 | 12/2008 | Low et al. |
| 7,558,649 B1 | 7/2009 | Sharma et al. |
| 7,596,476 B2 | 9/2009 | Rasmussen et al. |
| 7,620,480 B2 | 11/2009 | Patel et al. |
| 7,676,280 B1 | 3/2010 | Bash et al. |
| 7,726,144 B2 | 6/2010 | Larson et al. |
| 7,832,925 B2 | 11/2010 | Archibald et al. |
| 7,844,440 B2 | 11/2010 | Nasle et al. |
| 7,881,910 B2 | 2/2011 | Rasmussen et al. |
| 7,885,795 B2 | 2/2011 | Rasmussen et al. |
| 7,979,250 B2 | 7/2011 | Archibald et al. |
| 7,991,592 B2 | 8/2011 | VanGilder et al. |
| 8,155,922 B2 | 4/2012 | Loucks |
| 8,219,362 B2 | 7/2012 | Shrivastava et al. |
| 8,229,713 B2 | 7/2012 | Hamann et al. |
| 8,244,502 B2 | 8/2012 | Hamann et al. |
| 8,249,825 B2 | 8/2012 | VanGilder et al. |
| 8,315,841 B2 | 11/2012 | Rasmussen et al. |
| 8,355,890 B2 * | 1/2013 | VanGilder ........... G06F 17/5009 361/688 |
| 8,473,265 B2 | 6/2013 | Hlasny et al. |
| 8,509,959 B2 * | 8/2013 | Zhang ................ H05K 7/20836 454/184 |
| 8,639,482 B2 | 1/2014 | Rasmussen et al. |
| 8,725,307 B2 | 5/2014 | Healey et al. |
| 8,825,451 B2 | 9/2014 | VanGilder et al. |
| 2002/0059804 A1 | 5/2002 | Spinazzola et al. |
| 2003/0115024 A1 * | 6/2003 | Snevely ................... G06F 17/50 703/1 |
| 2003/0158718 A1 | 8/2003 | Nakagawa et al. |
| 2004/0089011 A1 * | 5/2004 | Patel ..................... F25B 5/02 62/259.2 |
| 2004/0240514 A1 | 12/2004 | Bash et al. |
| 2004/0262409 A1 | 12/2004 | Crippen et al. |
| 2005/0225936 A1 * | 10/2005 | Day ................... H05K 7/20754 361/679.47 |
| 2005/0237716 A1 | 10/2005 | Chu et al. |
| 2005/0267639 A1 * | 12/2005 | Sharma ............. G05D 23/1931 700/276 |
| 2006/0080001 A1 * | 4/2006 | Bash ................. G05D 23/1934 700/276 |
| 2006/0112286 A1 | 5/2006 | Whalley et al. |
| 2006/0121421 A1 | 6/2006 | Spitaels et al. |
| 2006/0168975 A1 | 8/2006 | Malone et al. |
| 2006/0214014 A1 | 9/2006 | Bash et al. |
| 2007/0038414 A1 | 2/2007 | Rasmussen et al. |
| 2007/0078635 A1 * | 4/2007 | Rasmussen ............... G06F 1/20 703/1 |
| 2007/0150215 A1 | 6/2007 | Spitaels et al. |
| 2007/0174024 A1 | 7/2007 | Rasmussen et al. |
| 2008/0055850 A1 | 3/2008 | Carlson et al. |
| 2008/0104985 A1 | 5/2008 | Carlsen |
| 2008/0174954 A1 * | 7/2008 | VanGilder .......... H05K 7/20836 361/679.54 |
| 2009/0138313 A1 * | 5/2009 | Morgan ................. G06Q 10/06 705/7.23 |
| 2009/0150123 A1 | 6/2009 | Archibald et al. |
| 2009/0205416 A1 | 8/2009 | Campbell et al. |
| 2009/0223234 A1 * | 9/2009 | Campbell ............. F24F 11/0001 165/293 |
| 2009/0259343 A1 | 10/2009 | Rasmussen et al. |
| 2009/0309570 A1 | 12/2009 | Lehmann et al. |
| 2009/0326879 A1 | 12/2009 | Hamann et al. |
| 2009/0326884 A1 | 12/2009 | Amemiya et al. |
| 2010/0106464 A1 * | 4/2010 | Hlasny ................ G06F 17/5004 703/1 |
| 2010/0131109 A1 * | 5/2010 | Rasmussen ............ G06F 1/206 700/277 |
| 2010/0256959 A1 * | 10/2010 | VanGilder .......... H05K 7/20836 703/6 |
| 2010/0286955 A1 * | 11/2010 | VanGilder ........... G06F 17/5009 702/182 |
| 2010/0286956 A1 * | 11/2010 | VanGilder ............... G06F 15/00 702/182 |
| 2010/0287018 A1 * | 11/2010 | Shrivastava .......... G06F 17/509 703/1 |
| 2011/0040529 A1 | 2/2011 | Hamann et al. |
| 2011/0101116 A1 * | 5/2011 | Bash .................... F24F 11/0001 236/94 |
| 2011/0246147 A1 | 10/2011 | Rasmussen et al. |
| 2011/0307820 A1 * | 12/2011 | Rasmussen ............ G06F 1/206 715/771 |
| 2012/0015598 A1 * | 1/2012 | Bagwell ................ F24F 13/072 454/251 |
| 2012/0041569 A1 * | 2/2012 | Zhang ................ G06F 17/5004 700/17 |
| 2012/0071992 A1 * | 3/2012 | Vangilder .......... H05K 7/20836 700/90 |
| 2012/0158375 A1 * | 6/2012 | Healey ............... H05K 7/20836 703/2 |
| 2012/0158387 A1 | 6/2012 | VanGilder et al. |
| 2012/0170205 A1 | 7/2012 | Healey et al. |
| 2012/0245905 A1 * | 9/2012 | Dalgas ................ G06F 17/5004 703/2 |
| 2012/0303166 A1 * | 11/2012 | Chang ................ G05D 23/1932 700/282 |
| 2013/0006426 A1 * | 1/2013 | Healey ............... H05K 7/20836 700/278 |
| 2014/0039691 A1 | 2/2014 | Gupta et al. |
| 2014/0122033 A1 | 5/2014 | VanGilder et al. |
| 2014/0330447 A1 | 11/2014 | VanGilder et al. |
| 2014/0358471 A1 * | 12/2014 | VanGilder ........... G06F 17/5004 702/130 |
| 2016/0249487 A1 * | 8/2016 | Bhagwat .................. G06F 1/20 |

OTHER PUBLICATIONS

Bemis at al. ("Data Center Airflow Modeling ", 2009 Applied Math Modeling Inc, pp. 1-4).*

Karki et al. ("Use of Computational Fluid Dynamics for Calculating Flow Rates Through Perforated Tiles in Raised-Floor Data Centers", International Journal of Heating, Ventilation, Air-Conditioning, and Refrigeration Research, vol. 9, No. 2, Apr. 2003, pp. 153-166).*

"Case Study, Application of TileFlow to Improve Cooling in a Data Center," Innovative Research, Inc., 2004.

"Essential Cooling System Requirements for Next Generation Data Centers," White Paper #5, Revision 3, 2003, American Power Conversion, Rev Mar. 2002, pp. 1-10.

"Optimizing facility operation in high density data center environments," 2007, Hewlett-Packard Development Company, pp. 1-25.

Abdlmonem H. Beitelmal et al.: "Thermo-Fluids Provisioning of a High Performance High Density Data Center" Distributed and Parallel Databases, Kluwer Academic Publishers, BO, vol. 21, No. 2-3, Apr. 22, 2006, pp. 227-238. XP019499843, ISSN: 1573-7578.

Ahmad, Jasim U. et al., "Navier-Stokes simulation of air-conditioning facility of a large modern computer room," Jun. 2005, Proceedings of the 2005 ASME Fluids Engineering Division Summer Meeting and Exhibition, pp. 1-6.

APC User's Guide Brochure, "InfraStruXure Manager," Mar. 2004, 181 pgs.

Ashrae, "Thermal Guidelines for Data Processing Environments" 2004, Atlanta: American Society of Heating, Refrigerating, and Air-Conditioning Engineers, Inc., 2004, Atlanta.

Bash, C.E. et al.: "Balance of Power: Dynamic Thermal Management for Internet Data Centers", IEEE Internet Computing , Jan. 1, 2005, pp. 42-49, vol. 9, No. 1, IEEE Service Center, New York, NY.

Bash, C.E., Patel, C.D., and Sharma, R.K., "Efficient Thermal Management of Data Centers—Immediate and Long-Term Research

(56) References Cited

OTHER PUBLICATIONS

Needs" Intl. J. Heat, Ventilating, Air-Conditioning and Refrigeration Research, 2003, pp. 137-152, vol. 9, No. 2.
Beitelmal et al., "Thermo-Fluids Provisioning of a High Performance High Density Data Center", Apr. 22, 2006, SPring Science and Business Media, Inc. Distributed and Parallel Databases, 21, pp. 227-238 DOI:1 0.1 007/s10619-005-0413-0.
Bemis et al, Data Center Airflow Modeling: Helps Facilities Planners Make Informed Decisions. Applied Math Modeling Inc. 2009 [retrieved on Apr. 19, 2012]. Retrieved from the internet: <URL: http://www.coolsimsoftware.com/wwwrooULinkCiick.aspx?fileticket=r1SqFUDtRTk%3D&tabid=189> entire document.
Chandrakant D. Patel, et al., "Thermal Considerations in Cooling Large Scale High Copute Density Data Centers" IEEE 2002, pp. 767-776.
Chen, Q. and Srebric, J., "Simplified Diffuser Boundary Conditions for Numerical Room Airflow Models," Final Report for ASHRAE RP-1009, Department of Architecture, Massachusetts Institute of Technology, Cambridge, MA, 2000, 181 pages.
Donald L. Beaty et al., "High Density Cooling of Data Centers and Telecom Facilities—Part 2," 2005, ASHRAE Transactions, vol. 111, pp. 932-944.
Dvinsky: "Hot Tips for Using Cooling Software a Little Planning Lets Users Get More from Their Thermal-Simulation Software", Machine Design, Penton Media, Cleveland, OH, vol. 72, No. 4, Feb. 24, 2000.
Ehsan Pakabaznia et al., "Miminizing data center cooling and server power costs", Proceedings of the 14th ACM/IEEE International Symposium on Low Power Electronics and Design, ISLPED '09, Jan. 1, 2009, p. 145, XP55015368, New York, New York, USA, DOI: 10.1145/1594233.1594268, ISBN: 978-1-60-558684-7.
Fried, E. and Idelchik, I.E., "Flow Resistance: A Design Guide for Engineers" Taylor and Francis, 1989, pp. 255-278.
Healey, C., et al., "Potential-Flow Modeling for Data Center Applications," Proceedings of the ASME 2011 Pacific Rim Technical Conference & Exposition on Packaging and Integration of Electronic and Photonic Systems, IPACK2011-52136, Jul. 6-8, 2011.
Herrlin, M.K., "Rack Cooling Effectiveness in Data Centers and Telecom Central Offices: The Rack Cooling Index (RCI),"ASHRAE Transaction, 2005, pp. 725-731, vol. 111(2).
Idelchik, I.E. et al., "Handbook of Hydraulic Resistance 3rd Edition" Jaico Publishing House, 2003, pp. 627-697.
James W. VanGilder et al., "Partially decoupled aisle method for estimating rack-cooling performance in near-real time," 2007, Proceedings of the IPACK2007 ASME InterPACK07, pp. 781-789.
Jeffrey Rambo et al., "Modeling of data center airflow and heat transfer: State of the art and future trends", Distributed and Parallel Databases, Kluwer Academic Publishers, BO, vol. 21, No. 2-3, Jan. 20, 2007, pp. 193-225, XP019499845, ISSN: 1573-7578, DOI:10.1007/S10619-006-7007-3.
Jeonghwan Choi et al., "A CFD-Based Tool for Studying Temperature in Rack-Mounted Servers", IEEE Transactions on Computers, IEEE Service Center, Los Alamitos, CA, US, vol. 57, No. 8, Aug. 1, 2008 (Aug. 1, 2008), pp. 1129-1142, ISSN: 0018-9340, DOI: 10.1109/TC.2008.52.
K. Dunlap, "Cooling Audit for Identifying Potential Cooling Problems in Data Centers", White Paper #40, pp. 1-18, American Power Conversion, May 20, 2004, published on World Wide Web.
Karki et al., "Techniques for controlling airflow distribution in raised-floor data centers," ASME 2003.
Karki, K.C. et al., "Use of Computational Fluid Dynamics for Calculating Flow Rates Through Perforated Tiles in Raised-Floor Data Centers," International Journal of Heating, Ventilation, Air-Conditioning, and Refrigeration Research, vol. 9, No. 2, Apr. 2003, pp. 153-166.
Karki, Kailash C., "Prediction of Distributed Air Leakage in Raised-Floor Data Centers," ASHRAE Transactions, Jan. 1, 2007, vol. 113, Issue 1, pp. 219-227.
Marwah, M.; Sharma, R.; Shih, R.; Patel, C.; Bhatia, V.; Mekanapurath, M.; Velumani, R.; Velayudhan, S., 2009, Data analysis, visualization and knowledge discovery in sustainable data centers, In Proceedings of the 2nd Bangalore Annual Compute Conference (COMPUTE '09).
N. Rasmussen, "Calculating Total Cooling Requirements for Data Centers", White Paper #25, pp. 1-8, American Power Conversion, May 20, 2004 published on World Wide Web.
N. Rasmussen, "Cooling Strategies for Ultra-High Density Racks and Blade Servers", White Paper #46, pp. 1-22, American Power Conversion, Mar. 29, 2005, published on World Wide Web.
N. Rasmussen, "Strategies for Deploying Blade Servers in Existing Data Centers", White Paper #125, pp. 1-14, American Power Conversion, Mar. 29, 2005, published on World Wide Web.
Neil Rasmussen, "Air Distribution Architecture Options for Mission Critical Facilities," White Paper #55, Revision 1, 2003 American Power Conversion, Rev 2003-0, pp. 1-13.
Neil Rasmussen, "Avoidable Mistakes that Compromise Cooling Performance in Data Centers and Network Rooms," White Paper #49, 2003 American Power Conversion, Rev 2003-0, pp. 1-15.
Pakbaznia, E.; Ghasemazar, M.; Pedram, M.; "Temperature-aware dynamic resource provisioning in a power-optimized datacenter," Design, Automation & Test in Europe Conference & Exhibition (DATE), 2010, vol., No., pp. 124-129, Mar. 8-12, 2010.
Refai-Ahmed G. et al., "Analysis of flow distribution in power supply using flow network modeling (FNM)", Thermal and Thermomechanical Phenomena in Electronic Systems, 2000, IT HERM 2000, The Seventh Intersociety Conference on May 23-26, 2000, Piscataway, NJ, USA, IEEE, Piscataway, NJ, USA, vol. 1, May 23, 2000 (May 23, 2000), pp. 90-98, ISBN: 978-0-7803-5912-3.
Roger R. Schmidt et al, "Best practices for data center thermal and energy management—review of literature," ASHRAE Transactions, vol. 112, pp. 206-218.
Sharma, R.K., Bash, C.E., and Patel, C.D., "Dimensionless Parameters for Evaluation of Thermal Design and Performance of Large-Scale Data Centers," 8th ASME/AIAA Joint Thermophysics and Heat Transfer Conference, Jun. 24-26, 2002. St. Louis, Missouri.
Shrivastava S K et al., Optimization of Cluster Cooling Performance for Data Centers, Thermal and Thermomechanical Phenomena in Electronic Systems, May 28, 2008, pp. 1161-1166, 11th Intersociety Conference on, IEEE, Piscataway, NJ.
Shrivastava S.K. et al., "A flow-network model for predicting rack cooling in containment systems", Proceedings of the ASME Interpack Conference—2009: Presented At 2009 ASME Interpack Conference, Jul. 19-23, 2009, San Francisco, California, USA, vol. 2, Jul. 19, 2009 (Jul. 19, 2009), pp. 785-791.
Toulouse M.M. et al., "Exploration of a potential-flow-based compact model of air-flow transport in data centers", Proceedings of the ASME International Mechanical Engineering Congress and Exposition—2009: Presented At 2009 ASME International Mechanical Engineering Congress and Exposition, Nov. 13-19, 2009, Lake Buena Vista, Florida, USA, vol. 13: New Del, vol. 13, Jan. 1, 2009 (Jan. 1, 2009), pp. 41-50, DOI: 10.1115/IMECE2009-10806, ISBN: 978-0-7918-4386-4.
Vanessa Lopez et al., "Measurement-based modeling for data centers", Thermal and Thermomechanical Phenomena in Electronic Systems (ITHERM), 2010 12th IEEE Intersociety Conference on, IEEE, Piscataway, NJ, USA, Jun. 2, 2010 (Jun. 2, 2010), pp. 1-8, XP031702357.
Vangilder et al., "Airflow Uniformity Through Perforated Tiles in a Raised-Floor Data Center", White Paper 121, Jul. 17-22, 2005, 10 pages.
Vangilder, J.W. et al., "Potential Flow Model for Predicting Perforated Tile Airflow in Data Centers," ASHRAE Transactions 2011, vol. 117, Part 2.
Vangilder, James W. et al., "Capture index: an airflow-based rack cooling performance metric," 2007, ASHRAE Transactions, vol. 113, pp. 126-136.
Vangilder, James W. et al., "Real-Time prediction of rack-cooling performance," 2006, ASHRAE Transactions, vol. 112, pp. 151-162.
International Search Report and Written Opinion for PCT/US2015/067092 dated Feb. 25, 2016.

\* cited by examiner

RAISED FLOOR PLENUM TOOL

BACKGROUND

Technical Field

The technical field relates generally to systems and methods for data center management and design, and more specifically, to systems and methods for determining airflow dynamics in a data center.

Background Discussion

Centralized network data centers typically consist of various information technology equipment, collocated in a structure that provides network connectivity, electrical power and cooling capacity. Often the equipment is housed in specialized enclosures termed "racks" which integrate these connectivity, power, and cooling elements. In some data center configurations, these rows are organized into hot and cold aisles to decrease the cost associated with cooling the information technology equipment. A raised floor having an air plenum beneath the floor is typically used for providing cooling air to the racks. Computer Room Air Handlers (CRAHs) pump cool air into the plenum, and the cool air is distributed from the air plenum to the racks through perforated tiles having open areas. The uniform delivery of airflow to the tiles is impacted by factors such as the layout of the room, the plenum depth, the perforated tile type, and other factors. As a consequence, the actual airflow delivered through the perforated tiles can vary widely throughout a facility. Furthermore, depending on floor construction and the number and size of cable cutouts, it is not uncommon for 50% or more of available CRAH airflow to be lost through leakage paths in a raised floor system.

For a given amount of CRAH airflow, typical design goals for the plenum system are to (1) ensure uniform airflow from tile to tile, and (2) minimize airflow lost to leakage through the raised floor and cutouts. Thus, the ability to quickly estimate the tile airflow uniformity and relative amount lost to leakage is of great value in designing a new facility and assessing the cooling performance of an existing one.

SUMMARY

Aspects and embodiments are directed to methods and systems for use with a raised floor data center. According to various aspects and embodiments, a method for use with a raised floor data center is provided. The method includes acts of receiving input data, including data related to at least one data center design parameter, determining tile airflow uniformity using the input data and at least one empirical correlation, implementing an analytical model to determine airflow distribution, the analytical model including at least one empirical formula, and using the tile airflow uniformity and the airflow distribution to evaluate airflow in a data center design.

According to one embodiment, the at least one empirical correlation is derived from a plurality of CFD simulations. According to another embodiment, the at least one empirical correlation is based on a determination of operational relationships between a plurality of data center design parameters, including combinations of data center design parameters.

According to another embodiment, implementing the analytical model further includes selecting, based on the input data, at least one equation of a plurality of equations that define airflow resistance values in a plurality of locations within the raised floor data center.

According to at least one embodiment, the method further includes displaying the evaluation of the tile airflow uniformity and the airflow distribution. According to some embodiments, the evaluation of the airflow distribution uses at least one value representative of at least one of base floor leakage airflow, cutout leakage airflow, and perforated tile airflow. According to certain embodiments, the evaluation of the tile airflow uniformity includes at least one value representative of a deviation from a mean tile airflow value.

According to various embodiments, the input data includes data center design parameters related to an area above the raised floor, including at least one of floor layout, total number of racks, total floor area, and typical row length. According to some embodiments, the input data includes data center design parameters related to the raised floor and a plenum located below the raised floor, including at least one of plenum depth, perforated tile type, raised floor construction, raised floor cutouts, and plenum obstructions.

According to certain embodiments, at least one data center design parameter includes an interpolated value between an upper threshold value representative of optimal data center design and a lower threshold value representative of worst case data center design.

According to another embodiment, the tile airflow uniformity and the airflow distribution are determined in real-time. According to some embodiments, the method is performed with a computer and at least one act is performed in a software program housed in a computer.

According to some embodiments, the method further includes adjusting at least one data center design based on the evaluation of the airflow.

According to various aspects and embodiments, a system for use with a raised floor data center is provided. The system includes at least one input configured to receive input data, including data related to at least one data center design parameter, a programmable device in communication with the at least one input, the programmable device comprising: a memory for storing the received input data, at least one processor coupled to the memory and configured to: determine tile airflow uniformity using the input data and at least one empirical correlation, implement an analytical model to determine airflow distribution, the analytical model including at least one empirical formula, evaluate airflow in a data center design using the tile airflow uniformity and the airflow distribution, and at least one output in communication with the programmable device and configured to display the evaluation corresponding to the tile airflow uniformity and the airflow distribution.

According to at least one embodiment, the at least one processor is further configured to select, based on the input data, at least one equation of a plurality of equations that define airflow resistance values in a plurality of locations within the raised floor data center. According to some embodiments, the output is configured to display at least one of base floor leakage airflow, cutout leakage airflow, and perforated tile airflow. According to a further embodiment, the output is configured to display at least one value representative of a deviation from a mean tile airflow value. According to some embodiments, the at least one data center design parameters include at least one of floor layout, total number of racks, total floor area, typical row length, plenum depth, perforated tile type, raised floor construction, raised floor cutouts, and plenum obstructions.

In accordance with one or more embodiments, a method for managing airflow in a raised floor data center is provided. The method includes the acts of receiving at least one data center design parameter, determining tile airflow uniformity using the at least one data center design parameter and at least one empirical correlation, implementing an analytical model to determine airflow distribution, the analytical model including at least one empirical formula, and altering at least one of a data center design parameter and a data center operating parameter based on at least one of the determined tile airflow uniformity and the airflow distribution.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1A:
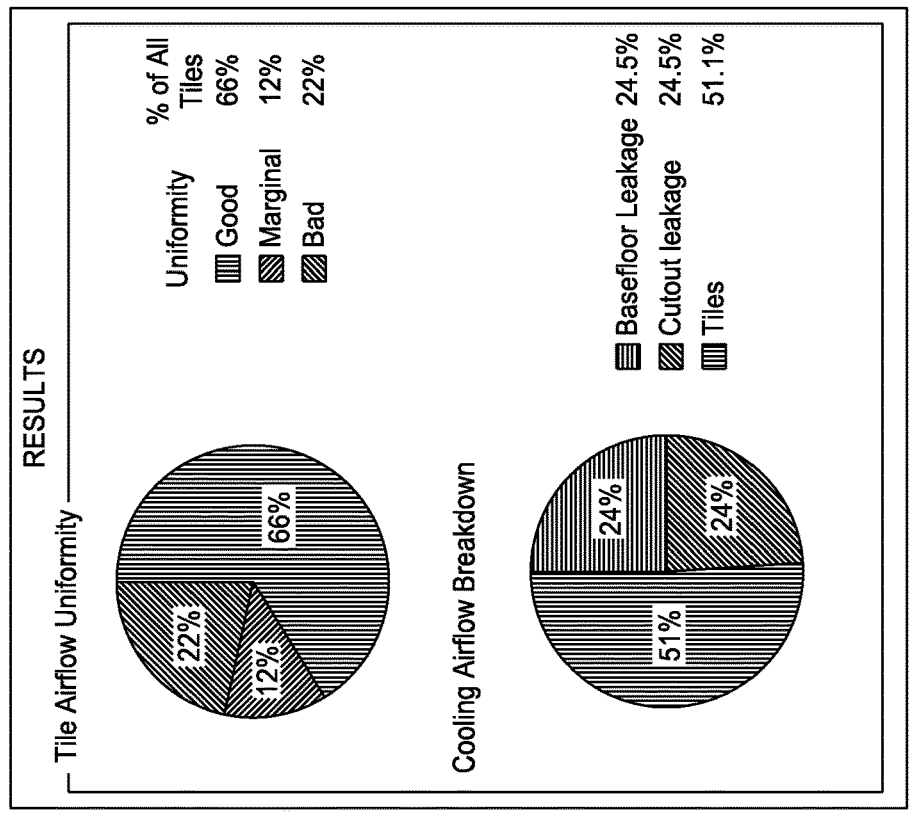
FIG. 1A shows an input feature of a user interface provided by a raised floor plenum tool in accordance with aspects of the invention.

Existing methods for determining and managing airflow, including tile airflow uniformity and airflow distribution (such as leakage airflow) in a raised floor data center are based on Computational Fluid Dynamics (CFD). Several commercially available tools allow a user to build detailed plenum and data center models for the purposes of providing tile-by-tile airflow rates using CFD-based software programs. While CFD-based tools provide detailed results and potentially high accuracy, even the simplest incarnations require a reasonably detailed floor layout that includes individual perforated tiles and CRAHs. Furthermore, these programs are typically expensive, slow to run, and require special expertise to operate. These tools may also require some knowledge of airflow modeling or difficult-to-estimate input parameters such as the leakiness characteristics of commercially available floor systems. As a result, CFD-based tools are only selectively employed and are difficult to distribute broadly. In response to these and other shortcomings, at least some embodiments described herein are directed to tools, systems, and methods by which airflow performance in a raised floor data center may be determined in real-time. For example, user displays including input data and airflow performance results may be updated in real-time as a user enters data into the tool. As used herein, the term "real-time" refers to results that are obtained with little or no time delay, and refers to processes that are completed in a matter of a few seconds or less rather than several minutes or longer as can happen with complex calculations (such as those involving typical CFD calculations). For example, in certain instances the level of computer responsiveness may be such that a user senses it to be sufficiently immediate, and/or the computer may be able to keep up with some external process (for example, to display visualizations of airflow performance results as the input data changes). The tools and methods disclosed herein may be used in conjunction with both data center design tools and data center management tools, and do not require expert operators.

By way of introduction, aspects of this disclosure relate to systems and methods for use in a raised floor data center, such as by determining airflow in a raised floor data center. According to at least one embodiment, a tool is provided that may be used for determining airflow in a raised floor data center. For example, the tool may provide a method for determining tile airflow uniformity and airflow distribution, including leakage airflow, in a data center. This method may be based on simple inputs that characterize the data center and do not rely on a detailed floor layout that requires specific positions for all equipment racks, perforated tiles, and CRAHs. Tile airflow uniformity generally describes the degree to which uniform airflow is delivered from the plenum and through the perforated tiles. Airflow distribution includes airflow through the perforated tiles as well as leakage airflow. Leakage airflow generally describes the amount of airflow lost to leakage, for example, through gaps or holes in the raised floor. According to certain aspects, the tool updates values attributed to tile airflow uniformity and airflow distribution in real-time as a user changes input data related to one or more data center design parameters. In certain instances, this process is capable of identifying dominant design parameters that dictate the behavior of the airflow. Unlike previous CFD-based tools, which solve for airflow physics for a specific configuration specified by the user, at least some systems and methods disclosed herein incorporate empirical results obtained from detailed CFD simulations and utilize an analytical model that is configured to consider the relative routes of airflow resistance for different perforated tile and floor construction layouts.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls. Moreover, titles or subtitles may be used in the specification for the convenience of a reader, which shall have no influence on the scope of the present invention.

In accordance with one or more embodiments, a method for determining airflow in a raised floor data center is provided. The method may include receiving input data, including data related to at least one data center design parameter. According to certain aspects, the at least one data center design parameter corresponds to characteristics of the data center that are above and/or below the raised floor. According to certain aspects, the input data is entered by a user, while according to other aspects, the information is accessed from a database or some other form of electronic storage. In certain embodiments, the tool displays a user interface, such as the user interface depicted in FIGS. 1A and 1B, through which the tool receives the input data and provides determined data center airflow results.

Figure 2A:
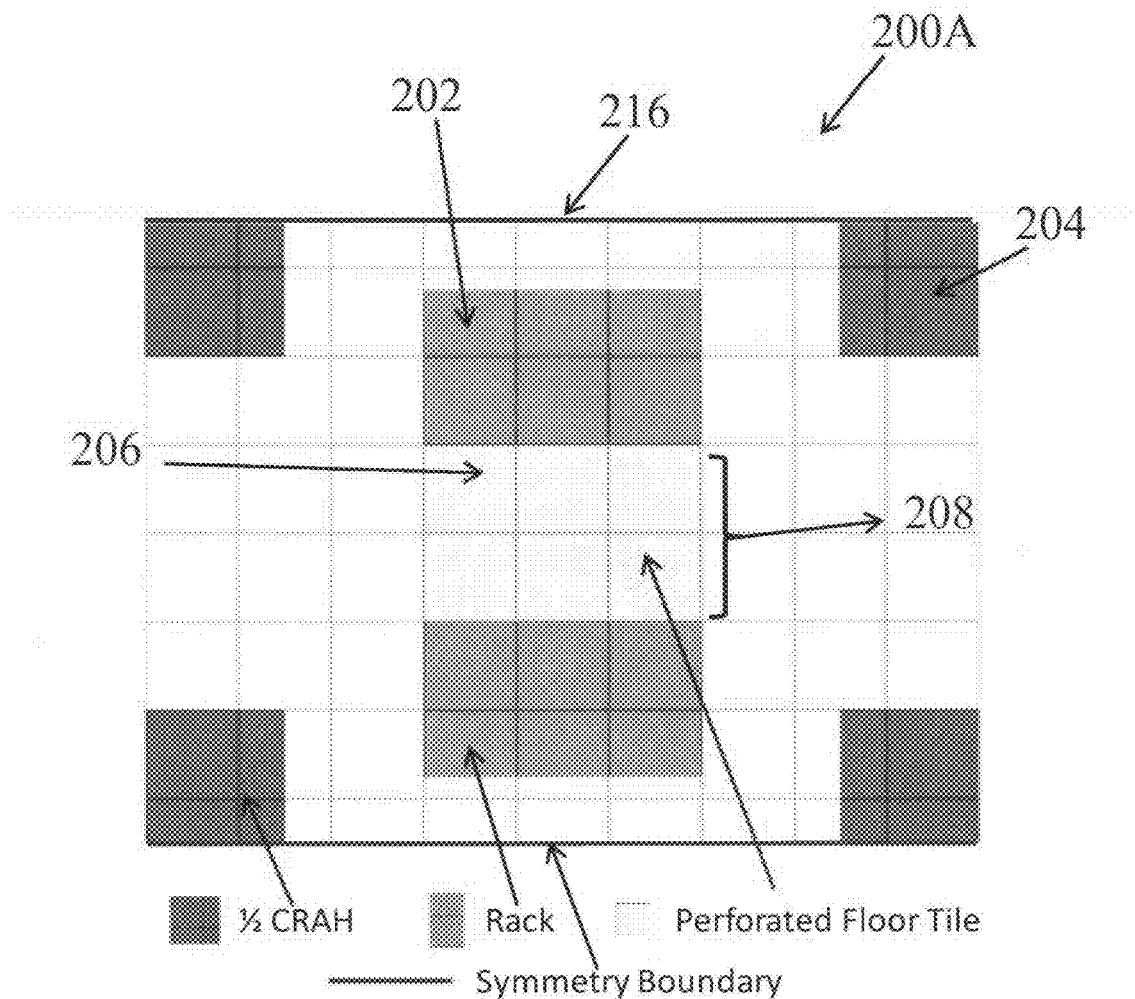
FIG. 2A shows a top view of an example of a data center layout in accordance with aspects of the invention.
Figure 2B:
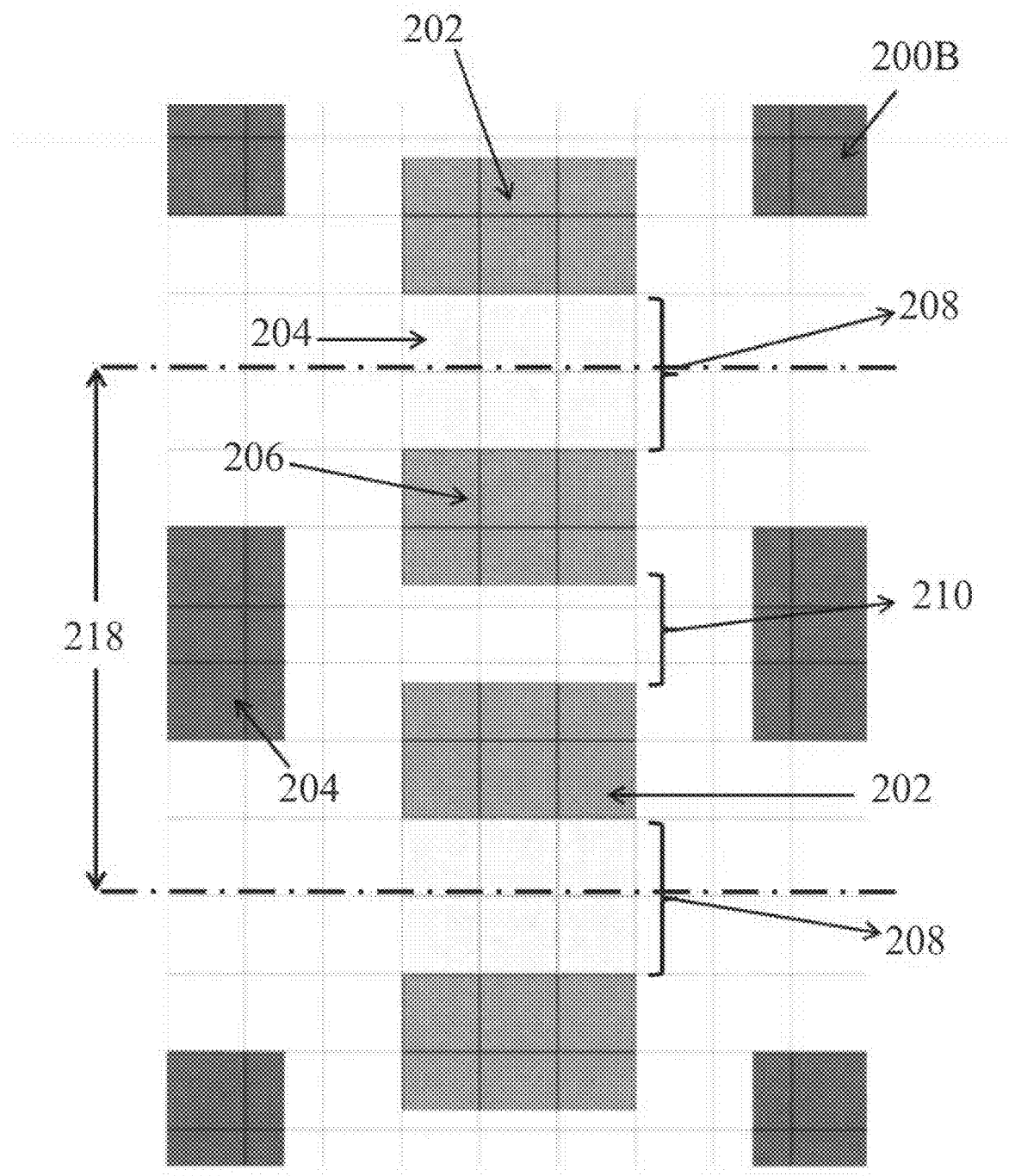
FIG. 2B shows a top view of another example of a data center layout in accordance with aspects of the invention.

According to some embodiments, the input data may include data center design parameters related to an area above the raised floor, and may describe at least one of floor layout, total number of equipment racks, total floor area, and the typical row length. Several of these parameters are featured in FIG. 1A. For example, "floor layout" may generally describe the degree to which the configuration of the equipment racks and CRAHs in the data center comply with industry standard "best practices" or predetermined guidelines, such as described in "Thermal Guidelines for Data Processing Environments" and "Design Considerations for Datacom Equipment Centers," as provided by the American Society of Heating, Refrigerating and Air-Conditioning Engineers (ASHRAE). Generally speaking, data center designs that comply with "best practices" maximize the flow of chilled air across and through the equipment racks. This usually requires that chilled air flows from bottom to top and from front to back through the racks, and may be implemented by positioning the perforated tiles so that the chilled air is directed into the racks. Alternating aisles between cold aisles and hot aisle, as discussed further below, also facilitates efficient control of temperature, as well as maintaining a static pressure within the raised floor plenum that is slightly higher than the space above the raised floor. FIGS. 2A and 2B are top view graphical representations of example equipment configurations according to a "best practice" or "optimal" type of data center design where, as explained further below, the CRAHs are aligned with the hot aisles of the equipment racks. The data center layout 200A shown in FIG. 2A includes six equipment racks 202, six perforated tiles 206, and four half-CRAH units 204 positioned in the upper corners. Further, the data center layout 200A has a row length of three, since there are three racks per row. At least one of the principles behind a "best practice" layout is to maximize the separation between the equipment rack exhaust air and intake air by establishing a hot aisle 210, as shown in FIG. 2B, where only the hot exhaust air from the equipment rack is present, and a cold aisle 208 where only equipment rack intakes are present. This minimizes the amount of hot exhaust air that is drawn into the equipment air intakes. Further, the measurement of row-to-row spacing (or between other corresponding points) is called pitch, and the pitch 218 of the data center row layout in FIG. 2B is the distance from one mid-cold-aisle 208 to the next mid-cold-aisle 208. Each pitch is defined by a number of tiles. For example, the tile size in FIG. 2B is 2 feet (600 mm) wide, and with a 7-tile overall width, the pitch is 14 feet. According to one aspect of "best practice" guidelines, the equipment racks 202 are aligned to tiles in the cold aisles due to the fact that in a raised-floor environment with perimeter-based cooling, full perforated tiles may be needed in the cold aisles for air delivery. Further, the CRAH units 204 are positioned so that they are aligned with the hot aisle 210 and blowing toward one another. This keeps the strongest airflow jets farthest from the perforated floor tiles 206, which helps improve tile airflow uniformity. In addition, layouts which feature CRAH units that blow airflow directly at one another are also less prone to recirculation regions, as discussed further below, which also improves tile airflow uniformity.

The data center layout 200B shown in FIG. 2B includes 12 equipment racks 202, 12 perforated tiles 206, and two full CRAH units 204 and four half-CRAH units 204 positioned in the corners. Data center layout 200B has the equipment racks 202 arranged such that adjacent rows face back-to-back, forming the hot aisle 210. As shown in FIG. 2B, the CRAH units 204 are aligned with the hot aisle 210.

According to some embodiments, the input data used to determine airflow may include data center design parameters related to the raised floor and/or the plenum below the raised floor. As shown in FIG. 1A, these parameters may describe at least one of plenum depth, perforated tile type, raised floor construction, raised floor cutouts, and plenum obstructions. For example, the perforated tile type indicates what percentage of the tile is open area, with typical values ranging from 25% to 56%. According to another example, "raised floor construction" and "raised floor cutouts" generally refer to the degree of "leakiness" of the raised floor, and to some extent, are also a reflection of how closely the construction of the raised floor complies with industry standard "best practices." For example, assuming air leakiness is distributed uniformly across the unoccupied raised floor space, a "bolted and gasketed" or "ideal" type of floor construction may have about 0.02% open area. This type of raised floor construction attempts to minimize the air leakage through the raised floor and may include floor tiles fitted with neoprene or similar gaskets positioned on their edges for the purposes of forming a seal when installed against other similar panels and the frame which supports them. In addition, these types of floors may include stringers or other floor components that are bolted together to increase floor rigidity and thereby decrease air leakage. In contrast, a "substandard" or "leaky" type of floor construction may have about 0.5% open area, and may generally describe a raised floor construction where little or no attempt is made to minimize air leakage through the raised floor, i.e., no gaskets, broken or faulty tiles, etc.

As discussed further below, a "typical" type of floor construction may have elements of both "ideal" and "leaky" types of construction, and may have about 0.4% open area. According to another example, a "typical" sized cutout in a raised floor for a single standard equipment rack may have dimensions of approximately 9×6 inches (i.e., 54 in$^2$). According to a further example, a "large" cutout in a raised floor may have dimensions of approximately 12×6 inches (or larger). According to yet a further example, raised floor cutouts having an open area sized to be 10% of the "typical" (9×6 inches) sized cutout may be characterized as "well-sealed" or "none." Other categories or designations for describing the cutouts are also within the scope of this disclosure, for example, a fourth designation may include raised floor cutouts having an open area sized to be 5% of the "typical" sized cutout.

According to some embodiments, at least one data center design parameter may describe plenum obstructions, including the degree to which obstructions such as chilled water pipes or other types of piping, power cables, data cables, or other types of cables and/or wiring, cable trays, electrical conduits, or any other type of blockage within the plenum that contributes to pressure drops and uneven airflow. For example, when used within the context of plenum obstructions, the term "none" may be used to characterize an empty plenum with no obstructions, whereas the term "extreme" may be used to characterize a plenum with many obstructions. According to at least one embodiment, plenums characterized as having "extreme" or "typical" degrees of obstructions may be considered to de-rate the tile airflow uniformity represented by the empty plenum by values of 10% and 5%, respectively, as discussed in further detail below.

Figure 3:
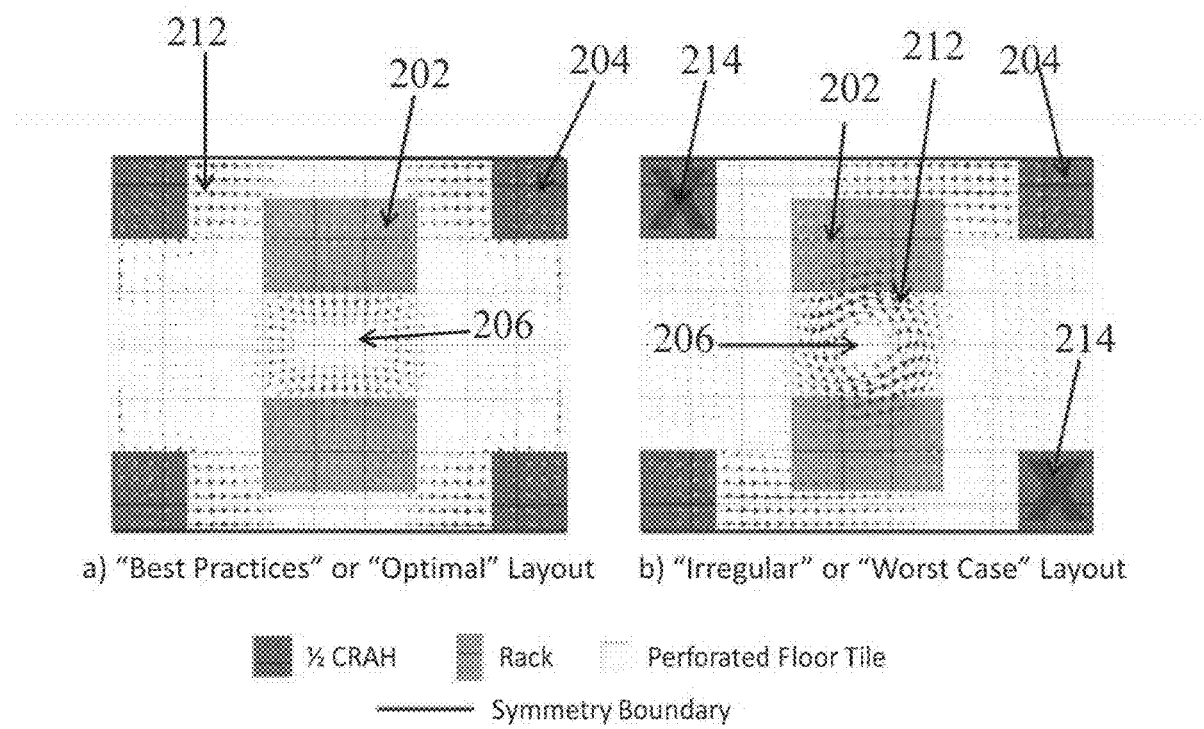
FIG. 3 shows two examples data center layouts that may be used in determining airflows in accordance with aspects of the invention.

According to at least one embodiment, the at least one data center design parameter may correspond or otherwise be representative of an optimal or "best practices" data center design or layout. Generally speaking, an optimal data center design may include one or more elements of symmetry, including geometric symmetry (i.e., the equipment is symmetric about a centerline) and symmetry with respect to airflow boundary conditions (i.e., air from the CRAHs is delivered to the perforated tiles in a symmetric flow pattern in terms of its geometric location and airflow velocity). For example, the data center design shown on the left (a) of FIG. 3 illustrates a "best practice" or "optimal" layout and includes both geometric symmetry with respect to the placement of the equipment racks 202 and the CRAHs 204, and symmetric airflow boundary conditions, as indicated by the small arrows representing CRAH airflow values 212, which indicate that the airflow rates are identical for all CRAHs 204. An optimized layout generally reflects an efficient and uniform distribution of cooling air from the CRAHs to the equipment racks. According to some embodiments, one or more of the data center design parameters discussed above may be representative of a symmetric data center design.

According to another embodiment, the at least one data center design parameter may correspond or otherwise be representative of an "irregular" data center design or layout. In contrast to the optimal data center design discussed above, an irregular design may reflect one or more elements of asymmetry. For example, the data center design shown on the right (b) of FIG. 3 illustrates an "irregular" or "worst case" layout and includes geometric asymmetry with respect to the placement of the CRAHs 204, which in turn creates asymmetric airflow boundary conditions. Geometric asymmetry is created by the two deactivated CRAHs 214 positioned in the opposite corners of the layout. This scenario creates asymmetric airflow via a "recirculation dead spot" underneath the center portion of the perforated tiles 206, where air from the CRAHs flows in a circular pattern around a central "dead" recirculation region where air velocities are very low. A worst case layout generally reflects an inefficient and non-uniform delivery of cooling air from the CRAH to the equipment racks. This type of layout is undesirable in that it exacerbates tile airflow non-uniformities which may drive the need to over-supply total airflow and therefore waste energy. The cooling costs in such a layout may be much higher than the ideal layouts discussed above.

In accordance with some embodiments, the at least one data center design parameter is an interpolated value between an upper threshold value representative of optimal data center design and a lower threshold value representative of worst case data center design. For example, a floor layout may be representative of the "best practice" layout, as shown in configuration (a) of FIG. 3, or the "worst case" layout, as shown in configuration (b) of FIG. 3, or may fall in between these configurations, and for purposes of this disclosure may be characterized as "typical," where the layout may have some elements of symmetry, and some elements of asymmetry. According to another embodiment, a raised floor construction characterized as "typical" may have elements of both an "ideal" type of floor construction where the open area is 0.02% or less, and a "leaky" type of floor construction where the open area is 0.5% or more, and may therefore have a value of 0.4%. According to some embodiments, the interpolated value is an interpolated average between the upper and lower threshold values. For example, according to one embodiment, plenum obstructions characterized as "typical" may reflect an approximate 5% degradation in tile airflow uniformity, which is the average value in between the optimal value of 0% representing an empty plenum (or "none"), and the worst case value of 10% representing an "extreme" level of physical obstructions.

Table 1 below lists several data center design parameters, including several parameters discussed above, that may be received as input data and used in determining airflow in a raised floor data center, such as tile airflow uniformity and/or airflow distribution. As will be appreciated by one of ordinary skill in the art, these values may be adjusted or changed depending on the application. For instance, in extremely large data centers, the typical row length may extend beyond 100 feet, and/or the total number of racks may exceed 1000.

TABLE 1

Example Data Center Design Parameters:

| Example Data Center Design Parameters | Example Values |
|---|---|
| Floor Layout | Best Practices, Typical, Irregular |
| Total Number of Racks | 1-1000 |

TABLE 1-continued

Example Data Center Design Parameters:

| Example Data Center Design Parameters | Example Values |
| --- | --- |
| Total Floor Area | 1-100,000 (ft$^2$) |
| Typical Row Length | 1-100 (ft) |
| Plenum Depth | 1-120 (in) |
| Perforated Tile Type (% open area) | 0-99% |
| Raised Floor Construction | Bolted and Gasketed, Typical, Substandard |
| Raised Floor Cutouts | None or Well Sealed, Typical, Large |
| Plenum Obstructions | None, Typical, Extreme |

In accordance with one or more embodiments, the method for determining airflow further includes incorporating the use of empirical data. According to some embodiments, the empirical data may be derived from a plurality of CFD simulations. The CFD simulations may contribute toward determining the operational relationships between a number of data center design parameters, including combinations of data center design parameters. For example, empirical data may be obtained from conducting a number of CFD simulations based on layouts similar to that shown in FIG. 2A. According to certain aspects, the layout reflects a "best practices" type of layout where the CRAHs are aligned with the hot aisles and the equipment layout repeats indefinitely in both directions beyond the symmetry boundaries 216. For example, FIG. 2B illustrates a layout that extends FIG. 2A in the vertical direction. Table 2 below represents a number of data center design parameters and their corresponding values that were used to conduct a plurality of CFD simulations.

TABLE 2

Data Center Design Parameters Used for CFD Analysis

| Data Center Design Parameters | Values |
| --- | --- |
| Floor Layout | Best Practices, Irregular |
| Row Length (Racks/Row) | 3, 5, 8, 12, 16, 20 |
| Plenum Depth | 1, 1.5, 2, 3, 4, 5 (ft) |
| Perforated Tile Type (% open area) | 25%, 40%, 56% (open area) |
| Raised Floor Construction | Bolted and Gasketed, Typical, Substandard |
| Raised Floor Cutouts | None or Well Sealed, Typical, Large |
| Room Size (additional spacing around equipment rack/tile cluster) | 0, 2, 4, 8, 12, 20 (ft) |

In total, 11,664 CFD simulations were conducted using these parameters to create a database containing tile airflow values for each layout configuration featured in Table 2. According to at least one embodiment, this database may be used to determine tile airflow uniformity based on input data, such as the data center parameters listed in Table 1. For example, input data shown in FIG. 1A, such as the total floor area, plenum depth, and type of raised floor construction may be used by the raised floor plenum tool to compare against the stored empirical data for the purposes of determining tile airflow uniformity. In addition, the tool computes the "typical" floor layout uniformity as an interpolated or weighted value between the "best practices" and "irregular" layouts that were actually determined using CFD. Using the results from the CFD simulations, the percentage of tiles which fall into the "good," "marginal," and "bad" ranges, as discussed in further detail below, are determined based on how far the resulting values are from the mean tile airflow.

According to one embodiment, empirical rules may be established from the CFD simulations, and the results of these analyses may be used to produce simple equations, look-up tables, or other empirical correlations that may be used in real-time for the purposes of determining airflow such as tile airflow uniformity. For example, the tool may be configured to store the values produced from the CFD simulations and then de-rate or interpolate between these values to produce airflow characteristics such as tile airflow uniformity for any combination of user inputs.

In accordance with some embodiments, the tool may display the results from the analysis discussed above, as shown in FIG. 1B. According to certain aspects, determined values representative of the degree of tile airflow uniformity are considered "good" if they are within ±20% of the mean tile airflow, "marginal" if they are between ±20% and ±40%, and "bad" if they are beyond±40% of the mean airflow. For instance, the tile airflow uniformity results in FIG. 1B indicate that given a proposed data center layout with certain input values, 66% of all the perforated tiles have airflow that is within ±20% of the mean tile airflow (i.e., "good"), 12% have airflow that is between ±20% and ±40% of the mean tile airflow (i.e., "marginal"), and 22% that are beyond±40% of the mean tile airflow (i.e., "bad"). According to a further aspect, and as mentioned above, a plenum characterized as having an "extreme" degree of obstructions may be considered to de-rate the tile airflow uniformity represented by the empty plenum by a value of 10%. For example, with reference to the results shown in FIG. 1B, this means that for "extreme" obstructions, the percentage of tiles that are considered to be in the "good" range (i.e., airflow within ±20% of the mean tile airflow) and "bad" range (i.e., beyond±40% of the mean tile airflow) are multiplied by 0.9, with the remaining percentage of tiles assigned to the "marginal" range (i.e., between ±20% and ±40% of the mean tile airflow). Thus, this essentially "moves" some of the percentage of tiles form "good" to "marginal" and also decreases the percentage of "bad" tiles somewhat by "moving" some of the tiles from "bad" to "marginal." A similar analysis may be performed for a plenum characterized as having a "typical" degree of obstructions, which is considered to de-rate the tile airflow uniformity represented by the empty plenum by a value of 5%, and therefore the percentage of tiles that are considered in the "good" and "bad" ranges are multiplied by 0.95.

According to some embodiments, input data may also include other information related to the data center, such as airflow rates of the CRAHs, including total CRAH airflow, airflow rates of the equipment racks, area of the perforated tile, air density, average rack density (e.g., in kW), and air ratio (the ratio of cooling airflow to equipment rack airflow). Additional input data may include, for example, an input parameter that combines the total number of racks and the total floor area into a single parameter, such as area/rack. As mentioned above, input data may be input by a user, such as through a user interface (e.g., a user interface similar to the one shown in FIG. 1A), and/or may be accessed from a computer database or some other form of electronic storage.

In accordance with at least one embodiment, an analytical model is provided that may be used or otherwise implemented to determine airflow in a data center, such as airflow distribution. Airflow distribution within the data center includes airflow through the perforated tiles and leakage airflow. According to certain aspects, the analytical model is configured to determine the relative airflow resistance values of different perforated tile and floor construction options, as explained further below.

In accordance with one or more embodiments, the analytical model is based on conservation of mass. For example, the sum of all tile airflows equals the CRAH airflow minus the leakage airflow, and therefore all airflow from a CRAH crosses the raised floor through either the perforated tiles or the leakage paths. In general, the pressure drop may be calculated according to Equation 1 below:

$$\Delta p = \frac{f}{2}\rho\frac{Q^2}{A^2} \qquad \text{Equation 1}$$

where f is the flow resistance, p is the air density, Q is the airflow rate, and A is the total resistance area, for example the entire area of a perforated tile (e.g., 4 ft$^2$, including both open and closed portions). The average pressure drop across the entire raised floor may be expressed as shown below by Equation 2:

$$\Delta p = \frac{f_{eq}}{2}\rho\frac{Q^2_{CRAH}}{A^2_F} \qquad \text{Equation 2}$$

where $f_{eq}$ is the equivalent (overall) flow resistance, $Q_{CRAH}$ is the airflow rate of the CRAH, and $A_F$ is the total unoccupied floor area, for example, the area not including the perforated tiles, racks, or CRAHs. As discussed above, leakage through the raised floor may occur through holes in the floor, such as through cutouts for cabling and piping, and/or through gaps, such as gaps in between tiles that are not fitted with gaskets or some other form of seal. Taking the perforated tile, base floor leakage, and cutout leakage resistances as separate resistances in parallel, $f_{eq}$ may be expressed as shown below by Equation 3:

$$f_{eq} = \frac{f_l f_c f_T}{\left[\sqrt{f_c f_T} + \sqrt{f_l f_T} + \omega_T \sqrt{f_l f_c}\right]^2} \qquad \text{Equation 3}$$

where $f_l$ is the base floor leakage flow resistance, $f_c$ is the cutout leakage flow resistance, $f_T$ is the perforated tile flow resistance and $\omega_T$ is the ratio of total perforated floor tile area to unoccupied floor area, and can be expressed as below as Equation 4:

$$\omega_T = \frac{TotalTileArea}{TotalUnoccupiedFloorArea} = \frac{A_T}{A_F} \qquad \text{Equation 4}$$

where $A_T$ is the total area of the perforated tiles.

Based on Equations 1-4 from above, it can be shown that the cooling airflow breakdown through the three parallel paths may be calculated according to Equations 5-7 below:

Fractional Base Floor Leakage Airflow = Equation 5

$$\frac{\sqrt{f_c f_T}}{\sqrt{f_c f_T} + \sqrt{f_l f_T} + \omega_T \sqrt{f_l f_c}}$$

Fractional Cutout Leakage Airflow = Equation 6

$$\frac{\sqrt{f_l f_T}}{\sqrt{f_c f_T} + \sqrt{f_l f_T} + \omega_T \sqrt{f_l f_c}}$$

Fractional Perforated Tile Airflow = Equation 7

$$\frac{\sqrt{f_l f_c}}{\sqrt{f_c f_T} + \sqrt{f_l f_T} + \omega_T \sqrt{f_l f_c}}$$

In addition, each of the flow resistance f values ($f_c$, $f_T$, and $f_l$) can be estimated using an empirical formula according to Equation 8:

$$f = \frac{1}{\beta^2}[1 + 0.5(1-\beta)^{0.75} + 1.414(1-\beta)^{0.375}] \qquad \text{Equation 8}$$

where β is the open area fraction of the resistance, for example, 0.25 for a 25% open perforated tile. For instance, for a tile with 25% open area, β is 0.25 and $f_T$ is calculated to be 42.8.

Figure 1B:
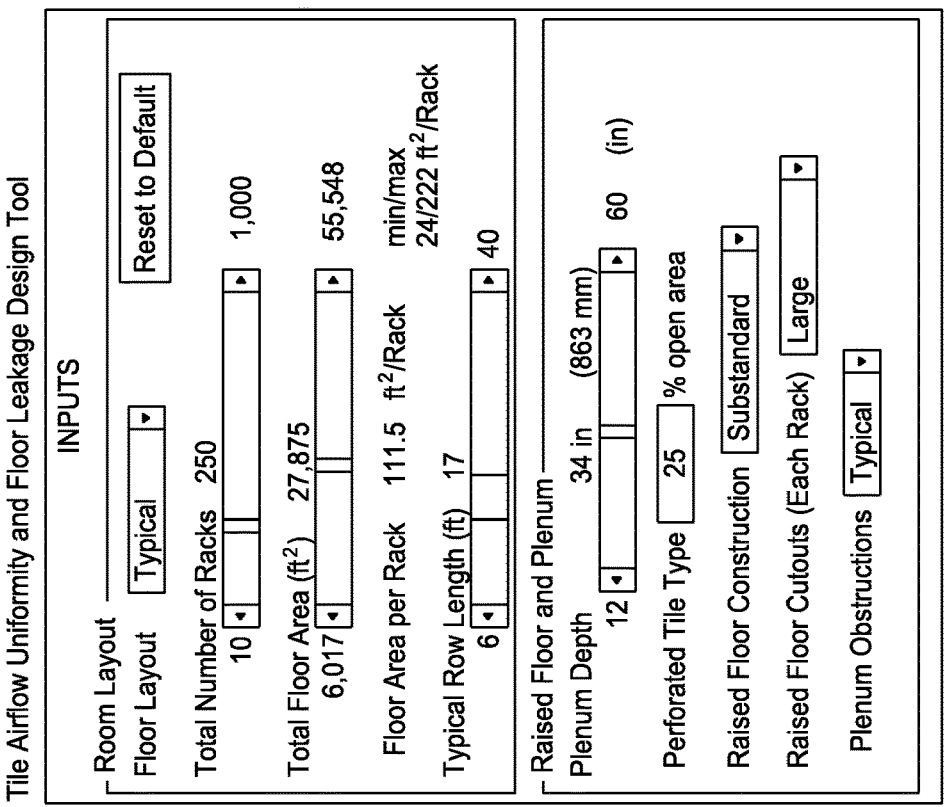
FIG. 1B shows a results feature of a user interface provided by a raised floor plenum tool in accordance with aspects of the invention.

In accordance with at least one embodiment, the method for determining airflow may implement an analytical model, such as the model described above, to determine airflow distribution. According to certain aspects, the analytical model includes at least one empirical formula, such as the formulas represented by Equations 5-8 above. In certain aspects, the analytical model further includes selecting, based on input data, at least one equation of a plurality of equations that describes airflow resistance values in a plurality of locations within the raised floor data center. For example, input data such as the perforated tile type, the airflow rate of the CRAH, the total area of the perforated tiles, the total unoccupied floor area, and other input data may be used by the raised floor plenum tool to determine airflow distribution through the perforated tiles (Equation 7), the cutouts (Equation 6), and the base floor (Equation 5). These results may also be displayed by the tool, as shown in FIG. 1B, where the airflow distribution values are further broken down into base floor leakage airflow, cutout leakage airflow, and perforated tile airflow. For instance, the airflow distribution results in FIG. 1B indicate that given a data center layout with certain input values, a little over half (51.1%) of the CRAH airflow actually goes through the perforated tiles, while 24.5% leaks through each of the base floor and cutouts.

According to an alternative embodiment, total CRAH airflow may be included as an input parameter, which may be used by the tool to compute the average plenum pressure (e.g., Equation 1). This may be useful in applications where CRAHs are controlled based on the average plenum pressure. According to this embodiment, other data center airflow characteristics, such as the average airflow per perforated tile, the airflow per cutout, and the total base floor leakage airflow, may each be determined.

In accordance with one or more embodiments, the systems and methods disclosed herein may include or otherwise make use of one or more sensors. For example, one or more sensors may be configured to detect one or more properties or characteristics of the data center, such as power to one or more loads, and/or environmental conditions, such as temperature, pressure, and humidity. For instance, one or more sensors may be configured to measure the airflow rate of a CRAH unit. The sensor(s) may be configured to generate a signal representative of the measured property or characteristic that can be sent as input data to one or more controllers, such as the processor discussed below in reference to FIG. 5.

According to a further embodiment, the method may include determining at least one dominant design parameter. For example, the tool may be used to determine which, if any, data center design parameters are contributing to or detracting from the tile airflow uniformity or airflow distribution. For instance, an evaluation (e.g., FIG. 1B indicating results) that indicates a large percentage of tiles that are classified as "bad" may be found to be primarily attributable to input data that includes a shallow plenum with an "extreme" level of obstructions. Further, an evaluation that indicates a high percentage of cutout leakage airflow may be attributed primarily to input data that corresponds to a small floor area with large cutouts. According to another aspect, a user may use the tool through an interface such as that shown in FIG. 1A, to vary one or more data center design parameters to see which parameters have little or no effect on the tile airflow uniformity and/or the airflow distribution (i.e., cooling airflow breakdown).

In accordance with some embodiments, the method may further include adjusting at least one data center design based on the evaluation of the airflow. For example, if the evaluation indicates that a large percentage of leakage airflow is attributed to the base floor, then input data corresponding to the initial data center design may be changed in an effort to reduce this value. For instance, if the initial input data included a substandard type of floor construction, then changing the input data to reflect an ideal type of floor construction may result in an evaluation that reduces the leakage airflow attributed to the base floor. According to some embodiments, tutorials may be provided to a user by the tool to assist the user in gaining knowledge in best practice design guidelines. The tutorials may be accessed by a user as desired or may be configured to be displayed as a user is taking a particular action. Using the above example, a tutorial may explain how different input parameters, such as the type of raised floor construction, affect different types of leakage airflow, including the leakage airflow attributed to the base floor.

According to certain embodiments, the systems and methods disclosed herein may be used for managing airflow in a raised floor data center. For example, according to some embodiments, the design of a data center and/or actual parameters in a data center may be altered based on the evaluation of the airflow. For instance, the location or the types of equipment racks, coolers (e.g., CRAHs, CRACs etc.) that are used in the actual layout of equipment or the proposed layout of equipment in the data center may be changed. For instance, equipment may be rearranged to reflect a "best practices" symmetrical layout such as that shown in FIGS. 2A and 2B. Further, other parameters such as the type of perforated tile (% open area) and/or the plenum depth may be increased or decreased based on the airflow evaluation. The raised floor construction may also be altered, for instance, by implementing a "bolted and gasketed" type of raised floor, and/or the "leakiness" of the raised floor cutouts may be altered by improving or installing seals or other devices that reduce the airflow leakage through the floor cutouts. Further, the degree of plenum obstructions may be altered, for example by reducing the amount of blockage and/or consolidating one or more of the obstructions, such as the pipes, cables, conduits, etc. as a result of the airflow evaluation. Further, based on the airflow evaluation, a controller, as discussed below in reference to FIG. 5, may alter one or more operating parameters of the data center. For instance, at least one of the determined tile airflow uniformity and/or airflow distribution may be used by a controller to control one or more cooling devices (including the components) to adjust airflow, or to control one or more equipment racks to reduce power if the airflow is not adequate to provide adequate cooling or increase power to a rack to consolidate IT workload to fewer equipment racks. One or more of these alterations may be implemented to improve the cooling performance and/or provide cost savings.

Figure 4:
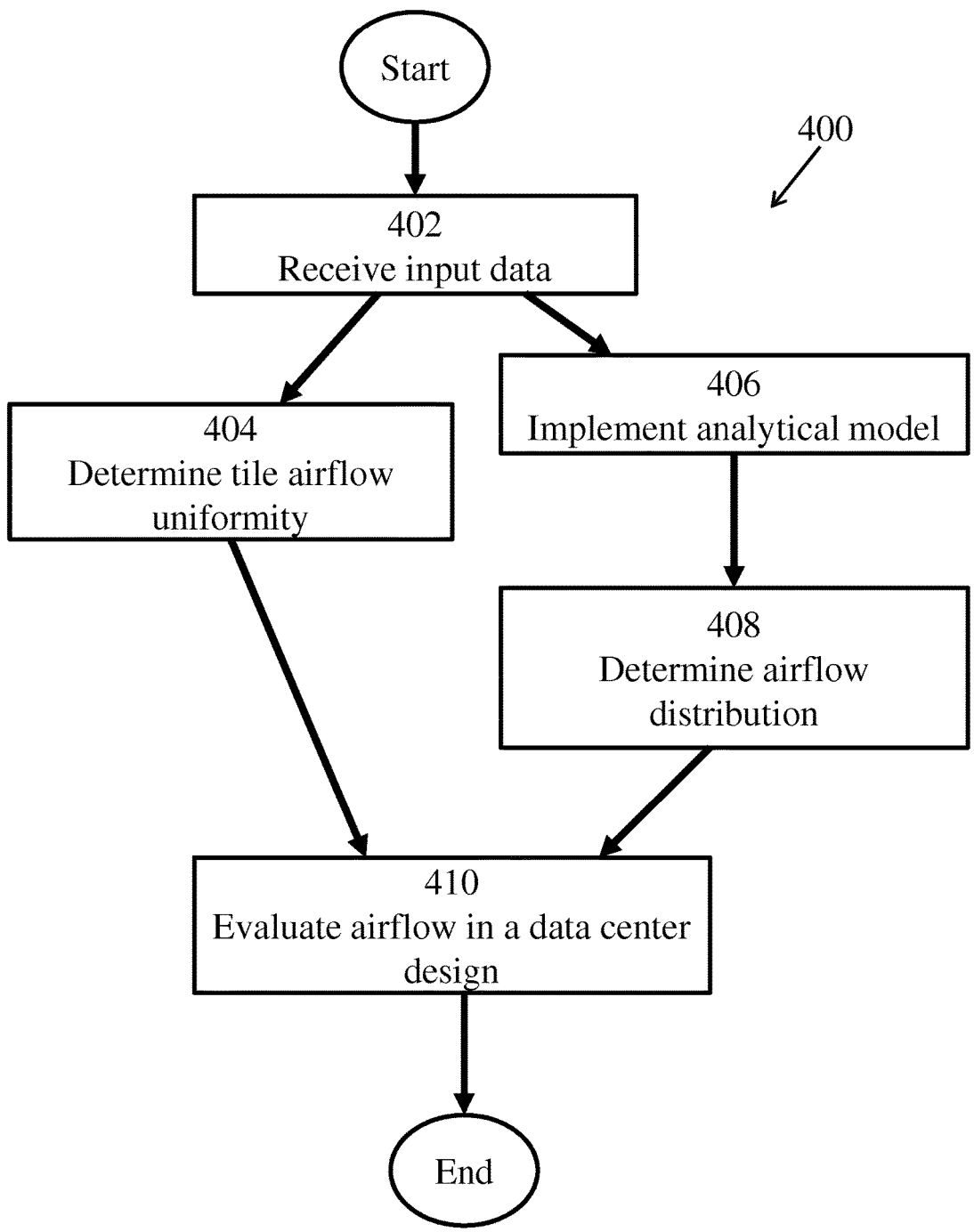
FIG. 4 is a flowchart for a process for determining airflow in a raised floor data center in accordance with aspects of the invention.

A summary of a process 400 for determining airflow in a raised floor data center using the methodology described above will now be provided with reference to FIG. 4. In a first stage 402 of the process, input data is received, such as the input data discussed above, including at least one data center design parameter. At stage 404, tile airflow uniformity is determined using best-fit curves, look-up tables, or some other form of empirical correlation based on CFD analysis as described above. At stage 406, an analytical model that includes at least one empirical formula is implemented. The analytical model may be used at stage 408 for determining airflow distribution. At stage 410, an evaluation of the airflow in a data center design may be performed using the tile airflow uniformity and airflow distribution. For example, an evaluation showing the different contributors to airflow distribution, including leakage airflow, or values representative of the percentage of tiles that deviate from a mean tile airflow value may be presented to a user, such as results similar to those shown in FIG. 1B.

In at least some embodiments described above, tools and processes are provided for determining airflow in a data center. In other embodiments, the tools and processes may be used in other types of data center centers, including those with overhead air plenums, and other types of air plenums.

Various aspects and functions described herein, including the airflow determination tool discussed above, may be included as specialized hardware or software components executing in one or more computer systems. For example, one or more acts of the method described above may be performed with a computer, where at least one act is performed in a software program housed in a computer. Non-limiting examples of computer systems include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 5:
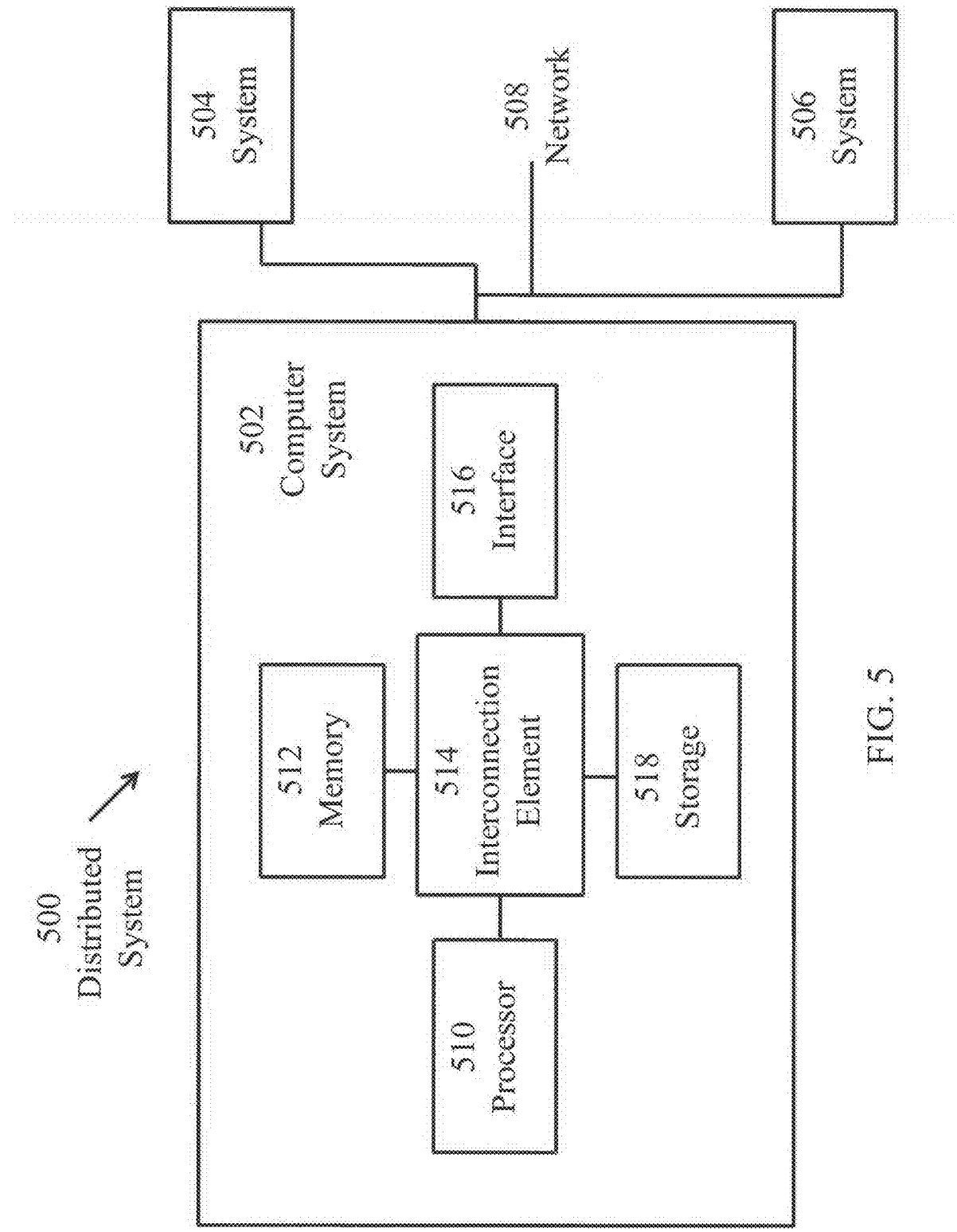
FIG. 5 is a block diagram of one example of a computer system that may be used to perform processes and functions disclosed herein.

Referring to FIG. 5, there is illustrated a block diagram of a distributed computer system 500, in which various aspects and functions are practiced. As shown, the distributed computer system 500 includes one or more computer systems that exchange information. More specifically, the distributed computer system 500 includes computer systems/devices 502, 504 and 506. As shown, the computer systems/devices 502, 504 and 506 are interconnected by, and may exchange data through, a communication network 508. The network 508 may include any communication network through which computer systems may exchange data. To exchange data using the network 508, the computer systems/devices 502, 504 and 506 and the network 508 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 502, 504 and 506 may transmit data via the network 508 using a variety of security measures including, for example, TLS, SSL or VPN. While the distributed computer system 500 illustrates three networked computer systems, the distributed computer system 500 is not so limited and may include any number of computer systems and computing devices, networked using any medium and communication protocol.

As illustrated in FIG. 5, the computer system 502 includes a processor 510, a memory 512, an interconnection element 514, an interface 516 and data storage element 518. To implement at least some of the aspects, functions and processes disclosed herein, the processor 510 performs a series of instructions that result in manipulated data. The processor 510 may be any type of processor, multiprocessor or controller. Some example processors include commercially available processors such as an Intel Xeon, Itanium, Core, Celeron, or Pentium processor, an AMD Opteron processor, an Apple A4 or A5 processor, a Sun UltraSPARC or IBM Power5+ processor and an IBM mainframe chip. The processor 510 is connected to other system components, including one or more memory devices 512, by the interconnection element 514.

The memory 512 stores programs and data during operation of the computer system 502. Thus, the memory 512 may be a relatively high performance, volatile, random access memory such as a dynamic random access memory ("DRAM") or static memory ("SRAM"). However, the memory 512 may include any device for storing data, such as a disk drive or other nonvolatile storage device. Various examples may organize the memory 512 into particularized and, in some cases, unique structures to perform the functions disclosed herein. These data structures may be sized and organized to store values for particular data and types of data.

Components of the computer system 502 are coupled by an interconnection element such as the interconnection element 514. The interconnection element 514 may include one or more physical busses, for example, busses between components that are integrated within a same machine, but may include any communication coupling between system elements including specialized or standard computing bus technologies such as IDE, SCSI, PCI and InfiniBand. The interconnection element 514 enables communications, such as data and instructions, to be exchanged between system components of the computer system 502.

The computer system 502 also includes one or more interface devices 516 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 502 to exchange information and to communicate with external entities, such as users and other systems.

The data storage element 518 includes a computer readable and writeable nonvolatile, or non-transitory, data storage medium in which instructions are stored that define a program or other object that is executed by the processor 510. The data storage element 518 also may include information that is recorded, on or in, the medium, and that is processed by the processor 510 during execution of the program. More specifically, the information may be stored in one or more data structures specifically configured to conserve storage space or increase data exchange performance. The instructions may be persistently stored as encoded signals, and the instructions may cause the processor 510 to perform any of the functions described herein. The medium may, for example, be optical disk, magnetic disk or flash memory, among others. In operation, the processor 510 or some other controller causes data to be read from the nonvolatile recording medium into another memory, such as the memory 512, that allows for faster access to the information by the processor 510 than does the storage medium included in the data storage element 518. The memory may be located in the data storage element 518 or in the memory 512, however, the processor 510 manipulates the data within the memory, and then copies the data to the storage medium associated with the data storage element 518 after processing is completed. A variety of components may manage data movement between the storage medium and other memory elements and examples are not limited to particular data management components. Further, examples are not limited to a particular memory system or data storage system.

Although the computer system 502 is shown by way of example as one type of computer system upon which various aspects and functions may be practiced, aspects and functions are not limited to being implemented on the computer system 502 as shown in FIG. 5. Various aspects and functions may be practiced on one or more computers having a different architectures or components than that shown in FIG. 5. For instance, the computer system 502 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 502 may be a computer system including an operating system that manages at least a portion of the hardware elements included in the computer system 502. In some examples, a processor or controller, such as the processor 510, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 510 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++ or Python. Thus, the examples are not limited to a specific programming language and any suitable programming language could be used. Accordingly, the functional components disclosed herein may include a wide variety of elements, e.g. specialized hardware, executable code, data structures or objects, which are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A method for use with a raised floor data center, comprising:
   receiving input data, including at least one data center design parameter related to the raised floor and a plenum located below the raised floor, the at least one data center design parameter including perforated tile type, raised floor construction, and raised floor cutouts;
   determining tile airflow uniformity using the input data and at least one empirical correlation;
   implementing an analytical model to determine airflow distribution through each of the perforated tiles, the raised floor, and the raised floor cutouts, wherein implementing the analytical model includes solving, based on the input data, a plurality of equations that include a first equation associated with airflow values through the perforated tiles, a second equation associated with airflow leakage values through the raised floor, and a third equation associated with airflow leakage values through the raised floor cutouts;
   using the tile airflow uniformity and the airflow distribution to evaluate airflow in a data center design; and
   altering one or more operating parameters of at least one of a cooling device and one or more equipment racks positioned in the data center based on the airflow evaluation.

2. The method of claim 1, wherein the at least one empirical correlation is derived from a plurality of Computational Fluid Dynamics (CFD) simulations.

3. The method of claim 2, wherein the at least one empirical correlation is based on a determination of operational relationships between a plurality of data center design parameters, including combinations of data center design parameters.

4. The method of claim 1, further including displaying the evaluation of the tile airflow uniformity and the airflow distribution.

5. The method of claim 4, wherein the evaluation of the airflow distribution uses at least one value representative of at least one of the base floor leakage airflow, the cutout leakage airflow, and the perforated tile airflow.

6. The method of claim 4, wherein the evaluation of the tile airflow uniformity includes at least one value representative of a deviation from a mean tile airflow value.

7. The method of claim 1, wherein the input data includes data center design parameters related to an area above the raised floor, including at least one of floor layout, total number of racks, total floor area, and typical row length.

8. The method of claim 1, wherein the input data that includes the at least one data center design parameter further includes plenum depth and plenum obstructions.

9. The method of claim 1, wherein at least one data center design parameter includes an interpolated value between an upper threshold value representative of optimal data center design and a lower threshold value representative of worst case data center design.

10. The method of claim 1, wherein the tile airflow uniformity and the airflow distribution are determined in real-time.

11. The method of claim 1, wherein the method is performed with a computer and wherein at least one act is performed in a software program housed in a computer.

12. The method of claim 1, further comprising adjusting at least one data center design based on the evaluation of the airflow.

13. A system for use with a raised floor data center, comprising:
   at least one input configured to receive input data, including at least one data center design parameter related to the raised floor and a plenum located below the raised floor, the at least one data center design parameter including perforated tile type, raised floor construction, and raised floor cutouts;
   a programmable device in communication with the at least one input, the programmable device comprising:
      a memory for storing the received input data;
      at least one processor coupled to the memory and configured to:

determine tile airflow uniformity using the input data and at least one empirical correlation;

implement an analytical model to determine airflow distribution through each of the perforated tiles, the raised floor, and the raised floor cutouts, wherein implementing the analytical model includes solving, based on the input data, a plurality of equations that include a first equation associated with airflow values through the perforated tiles, a second equation associated with airflow leakage values through the raised floor, and a third equation associated with airflow leakage values through the raised floor cutouts;

evaluate airflow in a data center design using the tile airflow uniformity and the airflow distribution;

alter one or more operating parameters of at least one of a cooling device and one or more equipment racks positioned in the data center based on the airflow evaluation; and at least one output in communication with the programmable device and configured to display the evaluation corresponding to the tile airflow uniformity and the airflow distribution.

14. The system of claim 13, wherein the at least one empirical correlation is derived from a plurality of Computational Fluid Dynamics (CFD) simulations.

15. The system of claim 13, wherein the output is configured to display at least one of the base floor leakage airflow, the cutout leakage airflow, and the perforated tile airflow.

16. The system of claim 13, wherein the output is configured to display at least one value representative of a deviation from a mean tile airflow value.

17. The system of claim 13, wherein the at least one data center design parameter further includes plenum depth and plenum obstructions, and the input data further includes design parameters related to an area above the raised floor, including at least one of floor layout, total number of racks, total floor area, and typical row length.

18. A method for managing airflow in a raised floor data center, comprising:

receiving at least one data center design parameter related to the raised floor and a plenum located below the raised floor, the at least one data center design parameter including perforated tile type, raised floor construction, and raised floor cutouts;

determining tile airflow uniformity using the at least one data center design parameter and at least one empirical correlation;

implementing an analytical model to determine airflow distribution through each of the perforated tiles, the raised floor, and the raised floor cutouts, wherein implementing the analytical model includes solving, based on the input data, a plurality of equations that include a first equation associated with airflow leakage values through the perforated tiles, a second equation associated with airflow leakage values through the raised floor, and a third equation associated with airflow leakage values through the raised floor cutouts; and altering a data center operating parameter based on at least one of the determined tile airflow uniformity and the airflow distribution.

* * * * *